US012700264B2

(12) United States Patent
Chae et al.

(10) Patent No.: US 12,700,264 B2
(45) Date of Patent: Aug. 4, 2026

(54) METHOD FOR RECOGNIZING A FAKE EYEBALL USING LIGHTS AT TWO WAVELENGTHS

(71) Applicant: CMITECH CO., LTD., Anyang-si (KR)

(72) Inventors: Jang-Jin Chae, Wonju-si (KR); Woong Park, Seoul (KR)

(73) Assignee: CMITECH CO., LTD., Anyang-si (KR)

( * ) Notice: Subject to any disclaimer, the term of this patent is extended or adjusted under 35 U.S.C. 154(b) by 260 days.

(21) Appl. No.: 18/716,803

(22) PCT Filed: Aug. 11, 2023

(86) PCT No.: PCT/KR2023/011949
§ 371 (c)(1),
(2) Date: Jun. 5, 2024

(87) PCT Pub. No.: WO2024/035213
PCT Pub. Date: Feb. 15, 2024

(65) Prior Publication Data
US 2026/0154989 A1      Jun. 4, 2026

(30) Foreign Application Priority Data

Aug. 12, 2022      (KR) ........................ 10-2022-0101144

(51) Int. Cl.
*G06V 40/40*          (2022.01)
*G06V 10/143*          (2022.01)
(Continued)

(52) U.S. Cl.
CPC ............ *G06V 40/40* (2022.01); *G06V 10/143* (2022.01); *G06V 10/56* (2022.01); *G06V 40/19* (2022.01)

(58) Field of Classification Search
CPC ....... G06V 40/40; G06V 10/143; G06V 10/56
See application file for complete search history.

(56) References Cited

U.S. PATENT DOCUMENTS

| | | | | |
|---|---|---|---|---|
| 2016/0019420 A1* | 1/2016 | Feng | ...................... | G06V 40/45 |
| | | | | 382/117 |
| 2016/0019421 A1* | 1/2016 | Feng | ................... | G06V 40/197 |
| | | | | 382/117 |
| 2018/0096119 A1* | 4/2018 | Yun | ........................ | A61B 5/024 |

FOREIGN PATENT DOCUMENTS

| | | | | |
|---|---|---|---|---|
| CN | 114582008 A | * | 6/2022 | ............ G06F 18/24 |
| KR | 100691772 B1 | | 3/2007 | |

(Continued)

OTHER PUBLICATIONS

International Search Report for PCT/KR2023/011949 dated Nov. 15, 2023, 7 pages.

(Continued)

*Primary Examiner* — Stephen R Koziol
*Assistant Examiner* — Ashley Hytrek
(74) *Attorney, Agent, or Firm* — NIXON & VANDERHYE P.C.

(57) ABSTRACT

A method for recognizing a fake eyeball using lights at two wavelengths comprises the steps of: illuminating simultaneously an eye region with lights at a first and a second wavelength; acquiring a single image of said eye region of said user, by using an imaging device in which R-color sensing elements, G-color sensing elements and B-color sensing elements are arranged; setting an inspection area by specifying a scleral portion, in said single image; calculating a first color average detection amount by averaging the detection amounts of the first color sensing elements at a location corresponding to said inspection area and a second color average detection amount by averaging the detection amounts of the second color sensing elements at the location (Continued)

corresponding to said inspection area; and calculating a ratio between said first and said second color average detection amounts, and comparing said ratio with a predetermined reference ratio.

5 Claims, 3 Drawing Sheets

(51) Int. Cl.
 *G06V 10/56* (2022.01)
 *G06V 40/19* (2022.01)

(56) References Cited

FOREIGN PATENT DOCUMENTS

| KR | 100711110 | B1 | | 4/2007 | |
| KR | 101032499 | B1 | | 5/2011 | |
| KR | 20110121874 | A | | 11/2011 | |
| KR | 101286454 | B1 | | 7/2013 | |
| KR | 20240012724 | A | * | 1/2024 | ............. G06V 40/18 |

OTHER PUBLICATIONS

Written Opinion of the ISA for PCT/KR2023/011949 dated Nov. 15, 2023, 3 pages.

* cited by examiner

METHOD FOR RECOGNIZING A FAKE EYEBALL USING LIGHTS AT TWO WAVELENGTHS

CROSS-REFERENCE TO RELATED APPLICATIONS

This application is the U.S. national phase of International Application No. PCT/KR2023/011949 filed Aug. 11, 2023 which designated the U.S. and claims priority to KR Patent Application No. 10-2022-0101144 filed Aug. 12, 2022, the entire contents of each of which are hereby incorporated by reference.

FIELD OF THE INVENTION

The present invention relates to a method for recognizing a fake eyeball. More specifically, the present invention relates to a method for recognizing a fake eyeball using lights at two wavelengths.

BACKGROUND

Recently, as iris-based security systems have become widely used, fraudulent authentication attempts using fake eyeballs, contact lenses, or prints on which pre-enrolled users' iris is printed have become an issue.

As a prior art for detecting fraudulent authentication attempts using a fake eyeball there is a Korean Patent No. 10-0691772 (hereinafter referred to as "Prior Art 1"). Said Prior Art 1 discloses that the user's eye is illuminated with a short-wavelength infrared light at a wavelength of 750 nm to obtain a short-wavelength eye image, the ratio of the brightness of the iris region to that of the sclera region (short-wavelength reflectance ratio) is calculated, and then, the user's eye is illuminated with long-wavelength infrared light at a wavelength of 850 nm to obtain a long-wavelength eye image, the ratio of the brightness of the iris region to that of the sclera region (long-wavelength reflectance ratio) is calculated, a fake eyeball is recognized using short-wavelength reflectance ratio and the long-wavelength reflectance ratio.

However, the Prior Art 1 discloses the method of photographing twice by performing separately the illumination at the different wavelengths. Therefore, while photographing by performing separately illumination twice, the reflection condition of the eyeball may change depending on the illumination state of the illuminating devices and the posture or gaze of the user, and thus the accuracy of recognizing a fake eyeball may vary.

As another prior art for recognizing a fake eyeball, there is a Korean Patent No. 10-1032499 (hereinafter referred to as "Prior Art 2"). Said Prior Art 2 discloses that an iris image is acquired by illuminating simultaneously lights at different wavelengths, the acquired iris image is separated per wavelength band using a CCD filter, the response degrees from the iris images separated per wavelength band is obtained, and the fake eyeball is recognized using the response degrees of the iris images separated per wavelength band.

In the Prior Art 2, lights with two wavelengths are simultaneously illuminated and iris images per wavelength are acquired using a dedicated CCD in which cells with L wavelength characteristics and cells with S wavelength characteristics are alternately formed.

In other words, the Prior Art 2 has the problem that it requires the dedicated CCD configured to detect only the L and S wavelengths.

In addition, the Prior Art 2 describes using a subtraction image of images at different wavelengths or an iris image to recognize a fake eyeball, but does not describe specific ways for doing so.

SUMMARY

It is an object of the present invention to solve the problems described above, and to provide a method for recognizing whether an eye is fake and/or whether an iris is fake using a single image taken by only one illumination.

It is another object of the present invention to provide a method for obtaining images at different wavelengths, using commonly available color imaging components.

It is a further object of the present invention to provide specific ways for recognizing a fake eyeball using images at different wavelengths.

A method for recognizing a fake eyeball using lights at two wavelengths, which is for resolving the object of the present invention, comprises the steps of: illuminating simultaneously an eye region including the iris and sclera of a user with a light at a first wavelength and a light at a second wavelength;

acquiring, synchronously with said illuminating, a single image of said eye region of said user, by using an imaging device in which R-color sensing elements, G-color sensing elements and B-color sensing elements are arranged in a Bayer pattern; setting an inspection area by specifying a scleral portion (E_S), in said single image; calculating a first color average detection amount by averaging the detection amounts of the first color sensing elements at a location corresponding to said inspection area in said single image and a second color average detection amount by averaging the detection amounts of the second color sensing elements at the location corresponding to said inspection area in said single image; and calculating a ratio ($A_{average}$) between said first color average detection amount and said second color average detection amount, and comparing said ratio ($A_{average}$) with a predetermined reference ratio ($A_{Ref}$) to determine whether said user's eye is a fake eyeball.

The first wavelength may be selected in the range of 750±50 nm and said second wavelength may be selected in the range of 850±50 nm.

The first color sensing elements may be R-color sensing elements, and the second color sensing elements may be B-color sensing elements.

The reference ratio ($A_{Ref}$) may be a ratio ($A_{average\_living}$) between a first color average detection amount and a second color average detection amount each measured at a sclera portion (E_S) of the user's eye, and wherein the ratio ($A_{average\_living}$) have been initially registered by the user to perform the method for recognizing a fake eyeball.

The reference ratio ($A_{Ref}$) may be a ratio ($A_{average\_artificial}$) between a first color average detection amount and a second color average detection amount experimentally measured using an arbitrary fake eyeball in the sclera portion of an arbitrary fake eyeball.

According to the present invention which includes the configuration as described above, it is possible to take a single image by only one illumination and to recognize whether an eye is fake by the single image taken.

Furthermore, the present invention is capable of obtaining images of different wavelengths, even if a conventional color imaging component is used. Therefore, it is not necessary to prepare a dedicated imaging component for acquiring images at different wavelengths.

Furthermore, the present invention provides specific ways for recognizing a fake eyeball using images at different wavelengths.

DETAILED DESCRIPTION

Hereinafter, with reference to the accompanying drawings, a preferred embodiment of a method for recognizing a fake eye using two wavelengths at light according to the present invention will be described. Furthermore, the terms referring to each component of the present invention are named exemplarily in view of its function and should not be understood as predicting and limiting the technical ideas of the present invention by the terms themselves.

Furthermore, the various embodiments of the invention that will be described hereinafter are intended only to illustrate the technical ideas of the invention by way of example. Accordingly, the scope of protection of the present invention should be interpreted in accordance with the appended claims. Furthermore, one having ordinary skilled in the art to which the invention pertains will be able to design various modifications and variations without departing from the essential features of the invention. Therefore, the scope of the invention should be interpreted as encompassing all technical ideas within the scope equivalent to the present invention.

Figure 1:
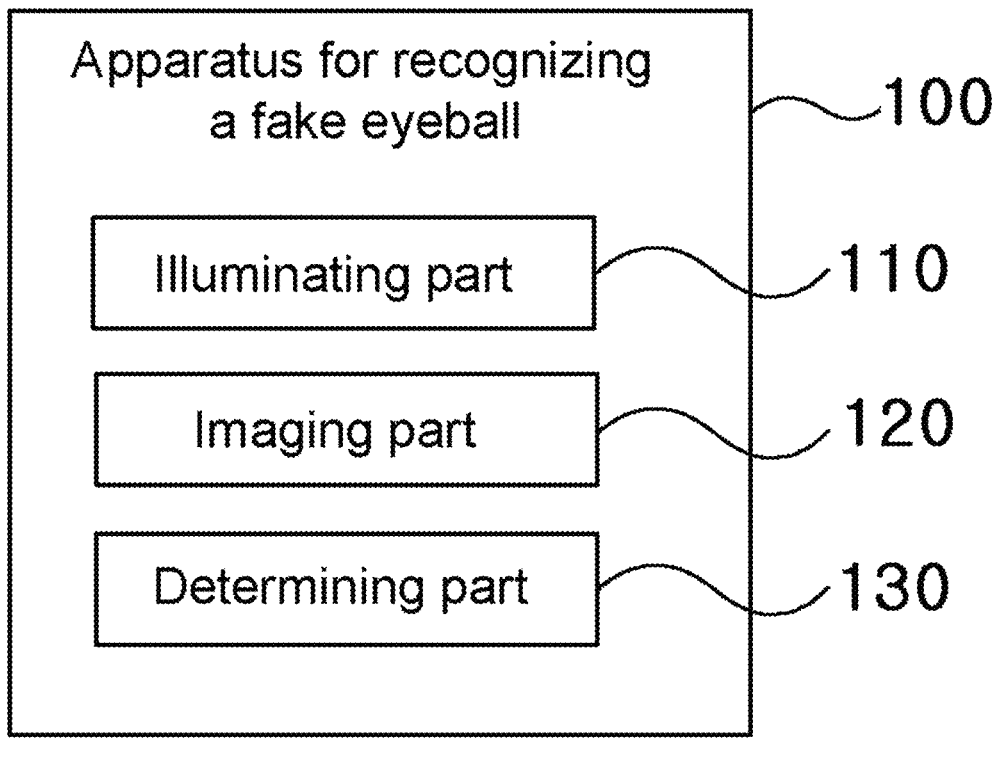
FIG. 1 illustrates a schematic configuration of a fake eyeball recognition device using lights at two different wavelengths, according to one embodiment of the present invention.
Figure 2:
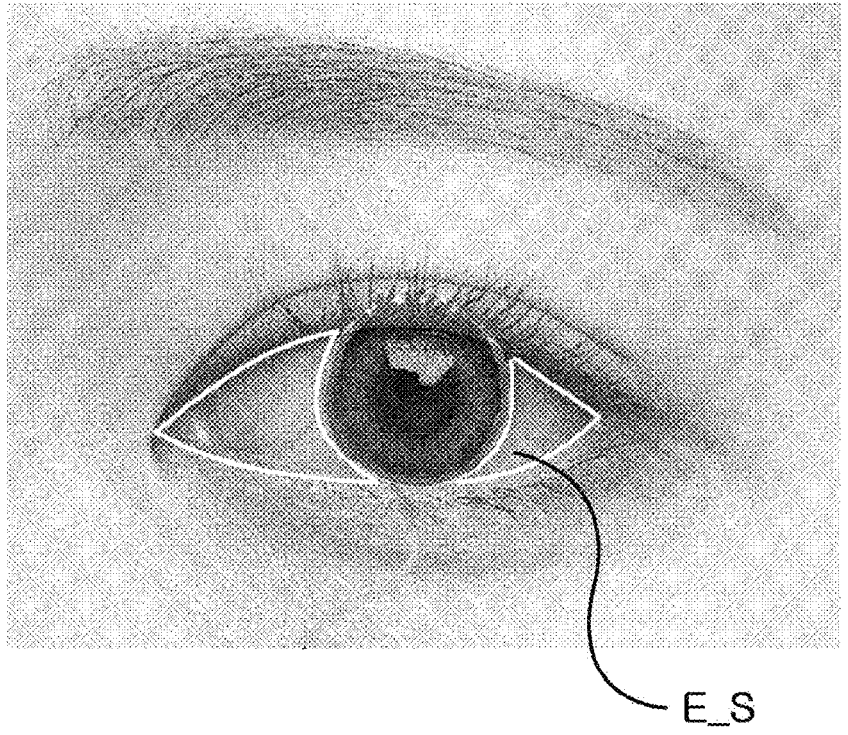
FIG. 2 illustrates an example of setting an inspection region in an acquired eye image.
Figures 3A, 3B:
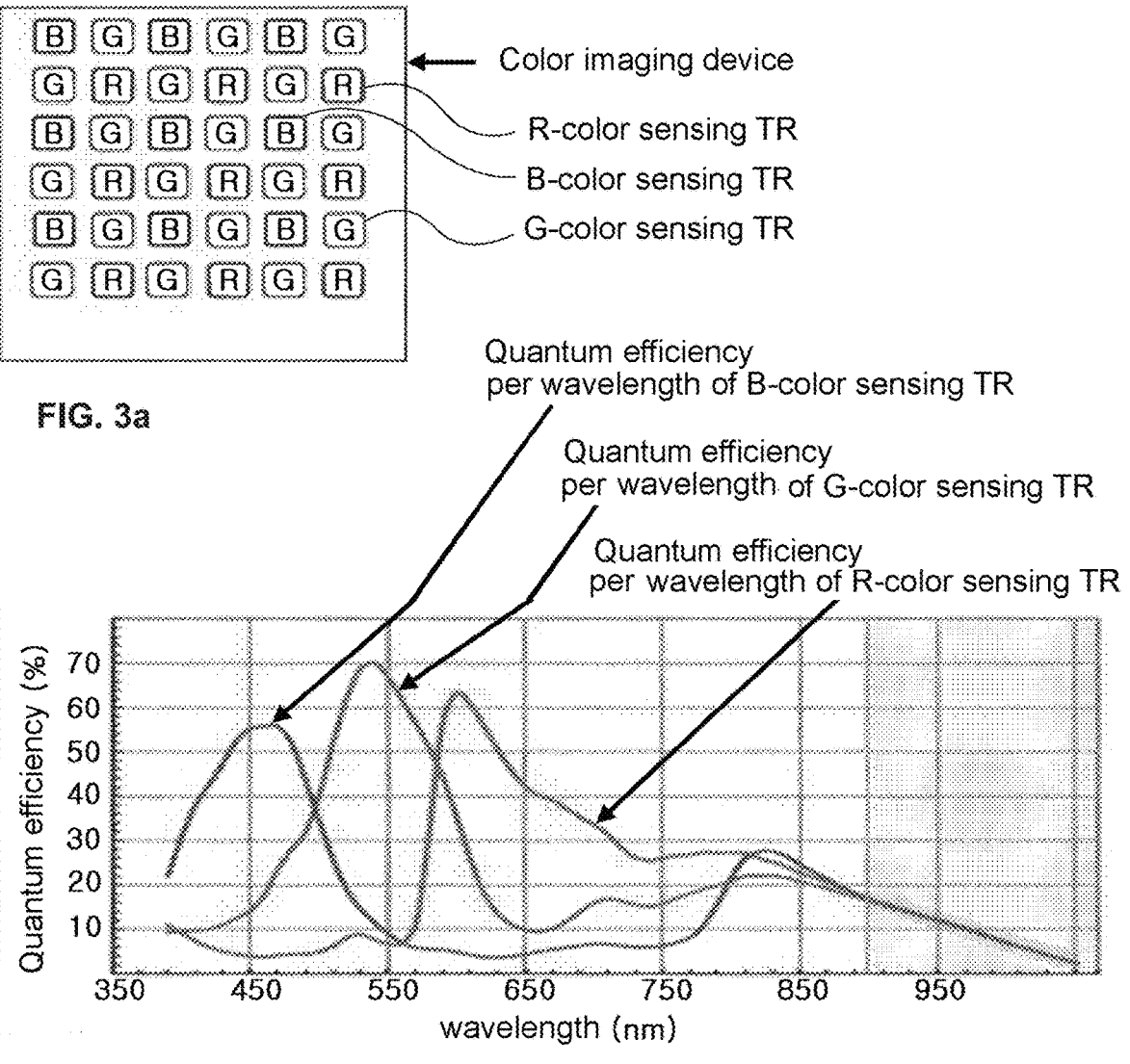
FIGS. 3a and 3b respectively illustrate the Bayer pattern of a color imaging component and a graph of quantum efficiency per wavelength of each color sensing element in a color imaging component.

First, with reference to FIGS. 1 to 3b, the configuration and operation of a fake eyeball recognition device 100 using lights at two different wavelengths presented in the present invention will be described. FIG. 1 illustrates a schematic configuration of a fake eyeball recognition device 100 for performing the method of recognizing a fake eyeball using lights at two different wavelengths, according to one embodiment of the present invention. FIG. 2 illustrates an example of setting an inspection region in an acquired eye image, wherein an example of an iris region and a sclera region are shown. FIG. 3a illustrates the Bayer pattern of a color imaging component and FIG. 3b is a graph which illustrates a quantum efficiency per wavelength of each color sensing element.

Referring to FIG. 1, a fake eyeball recognition device 100 according to one embodiment of the present invention may include an illuminating part 110, an imaging part 120, and a determining part 130.

The illuminating part 110 is configured to simultaneously irradiate light at the first wavelength and light at the second wavelength to the eye region including the iris and sclera of the user. The illuminating part 110 may comprise a single light source capable of emitting both the light at the first wavelength and the light at the second wavelength together. Alternatively, the illuminating part 110 may comprise a first light source emitting the light at the first wavelength and a second light source emitting the light at the second wavelength, and operate them simultaneously.

The imaging part 120 may be a camera with a color imaging component. The color imaging component may include a CCD in which an R-color sensing element for detecting the red color, a B-color sensing element for detecting the blue color, and a G-color sensing element for detecting the green color are arranged, for example, in a Bayer pattern (see FIG. 3a).

In other words, the imaging part 120 of the present invention is characterized in that it uses an imaging component which can be mounted on a commercially available camera and which has elements for detecting R, G, and B colors in the visible light region. (This means, for example, that the imaging part of the present invention does not utilize a specially designed imaging component which has arranged alternately only elements for detecting light at a wavelength of 750 nm and elements for detecting light at a wavelength of 850 nm.) On the other hand, this commonly commercialized imaging element is capable of detecting light in the infrared wavelength range due to the basic nature of the sensing elements of each color (see FIG. 3b). The present invention takes advantage of the fact that this commonly commercialized imaging element is capable of detecting light in the infrared wavelength range.

Meanwhile, the imaging part 120 receives lights reflected from the pupil of the user's eye (including the iris and sclera) and the area around the eye in synchronization with the time when the illuminating part 110 irradiates light toward the user's eye, and acquires (or photographs) a single image of the eye.

In the present invention, the light at the first wavelength may be infrared light at a wavelength of 750±50 nm. Further, the light at the second wavelength may be infrared light at a wavelength of 850±50 nm.

Alternatively, referring to the quantum efficiency of respective color sensing elements in the color imaging element, the light having a high detection amount in one color sensing element can be selected as the light at the first wavelength and the light having a high detection amount in the other color sensing element can be selected as the light at the second wavelength.

The determining part 130 may be configured to analyze one image acquired by the imaging part 120, determine whether the currently imaged eye is a fake eyeball, and transmit the determined result to outside.

Specifically, the determining part 130 determines whether the currently photographed eye is a fake eyeball, by setting an inspection area in the single acquired image, obtaining respective average values of detection amounts (or light intensities) of the same color sensing elements at the location corresponding to the inspection area, calculating a ratio ($A_{average}$) between the obtained average values for two different colors, and comparing the calculated ratio to a predetermined reference ratio ($A_{Ref}$).

For example, it is possible to recognize a fake eyeball, by obtaining a ratio between the average value of the detected amounts for the inspection area by the R-color sensing elements and the average value of the detected amounts for the inspection area by the B-color sensing elements, and comparing the obtained ratio with a reference ratio ($A_{Ref\_artificial}$) pre-calculated using the fake eyeball.

By another method, it is possible to determine whether the currently photographed eye is a fake eyeball, by obtaining a ratio between the average value of the detection amounts by the R-color sensing elements and the average value of the detection amounts by the B-color sensing elements from the eye image of the user taken when the user first attempts to register his or her eye with the fake eyeball recognition device or when the user attempts to input the reference ratio using his or her eye, defining the value of the obtained ratio as a reference ratio ($A_{Ref\_living}$), and then comparing the ratio ($A_{average}$) calculated from the currently photographed eye image with the reference ratio ($A_{Ref\_living}$).

Referring to FIG. 2, a way of setting an inspection area in the present invention will be described. The fake eyeball recognition device 100 according to the present invention, when acquiring an eye image of a user, can identify eyebrows, eyelids, pupils, irises, sclera, etc. from the eye image using a contrast/color/chroma distribution of the eye image.

In the present invention, the sclera portion (E_S) of the user's eye image is set as an inspection area to determine whether the currently photographed eye is a fake eyeball.

The sclera is typically white in color (regardless of the color of the iris) and has little individual variation. Therefore, it is possible to recognize a fake eyeball, by comparing the ratio ($A_{average\_sclera}$) calculated from the sclera portion (E_S) of the user's currently photographed eye image to a pre-calculated reference ratio ($A_{Ref\_artificial\ sclera}$) using the sclera of a fake eyeball or eye printout or a white sheet of paper.

In this case, if the ratio ($A_{average\_sclera}$) calculated from the current user is similar to the reference ratio ($A_{Ref\_artificial\ sclera}$), the photographed eye may be determined to be a fake eyeball.

In the meantime, the reference ratio may be a previously obtained and calculated ratio ($A_{Ref\_living\ sclera}$) from the said user. In this case, if the currently obtained and calculated ratio ($A_{average\_sclera}$) from the user is similar to the reference ratio ($A_{Ref\_living\ sclera}$) previously obtained from the user, the photographed eye will be determined to be a real eyeball.

In the present invention, the infrared lights used for recognizing a fake eyeball in the present invention may be infrared lights in the wavelength range of 750±50 nm and infrared light in the wavelength range of 850±50 nm. These wavelengths are chosen because short wavelength infrared light penetrates the human skin (pupil) shallowly and is reflected instantly from the surface of the pupil or from shallow skin, and long wavelength infrared light penetrates the human skin deeply and is reflected weakly, and these different reflective properties can be utilized. On the other hand, infrared light cannot penetrate the fake eyeball, so infrared light will be reflected with high reflectance from the surface of the fake eyeball.

In the present invention, an R-color sensing element is used to measure the reflected light at short-wavelength infrared light, and a B-color sensing element is used to measure the reflected light at long-wavelength infrared light.

Referring to FIG. 3b, the B-color sensing element has a low quantum efficiency for the short wavelength infrared light at 750 nm and a high quantum efficiency for the long wavelength infrared light at 850 nm. Therefore, using the B-color sensing element, it is possible to detect and measure the reflected light at the long wavelength infrared light at 850 nm even if the light at 750 nm and the light at 850 nm are irradiated together.

Meanwhile, the R-color sensing element has approximately similar quantum efficiency for the short wavelength of 750 nm and the long wavelength of 850 nm. Therefore, for example, the detection amount of reflected light of the B-color sensing element can be subtracted from the detection amount of reflected light of the R-color sensing element to obtain the detection amount of infrared light at a short wavelength of 750 nm.

In this case, the G-color sensing element is not used in the present invention because the difference between the quantum efficiencies of the 750 nm and the quantum efficiencies of the 850 nm of the G-color sensing element is not very large compared to other sensing elements and the quantum efficiencies of the 750 nm and the quantum efficiencies of 850 nm are not similar to each other.

However, which wavelength of light to select and which color sensing element to utilize can be determined based on the characteristics of the imaging device, because the quantum efficiency per wavelength of each of these color sensing elements can vary depending on the design and materials of each color sensing element.

In particular, the present invention recognizes a fake eyeball, by obtaining average reflectance values of each of infrared lights of two different wavelengths (i.e., average values of the detection amount of color sensing elements for each color), and comparing the ratio ($A_{average}$) of the average values to a reference ratio ($A_{Ref}$). This results in a higher recognition accuracy compared to detecting fake eyeballs using an infrared light at single wavelength. In addition, since a single value is calculated (i.e., a ratio of the average values of the detection amount of color sensing elements for each color) and the fake eyeball is recognized using the calculated single value, the processing result is clear and the processing speed is fast.

Figure 4:
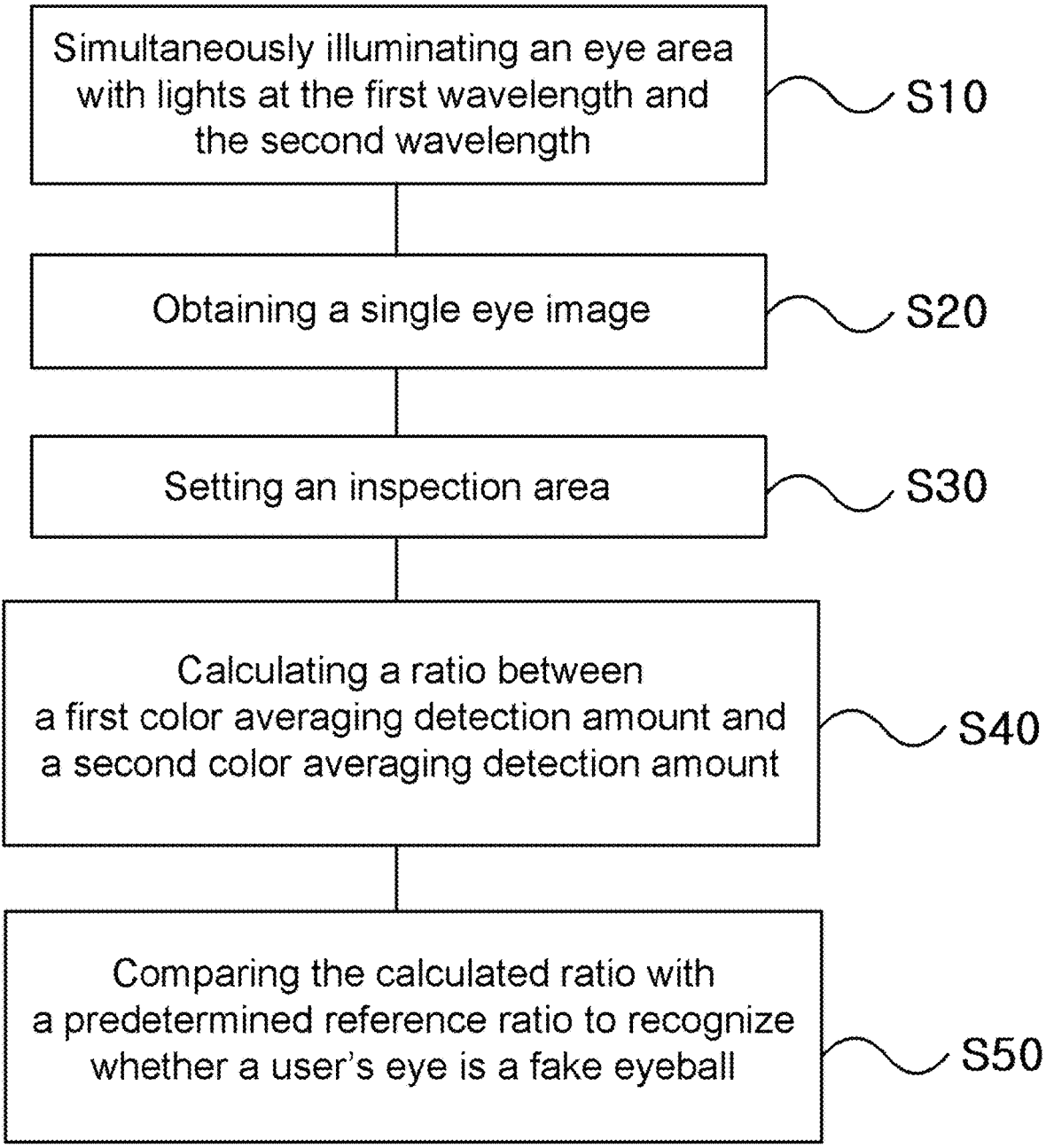
FIG. 4 is a flow chart illustrating a method for recognizing a fake eyeball using lights at two different wavelengths, according to another embodiment of the present invention.

Next, referring to the flowchart shown in FIG. 4, a method for recognizing a fake eyeball using lights at two wavelengths will be described, by using the fake eyeball recognition device 100 as described above.

First, by using the illuminating part 110, a light at the first wavelength and a light at the second wavelength are simultaneously irradiated to the eye area of the user including the iris portion and the sclera portion (S10).

Then, by using an imaging element in which R-color sensing elements, G-color sensing elements and B-color sensing elements are arranged in a Bayer pattern, the eye area of the user is photographed once in synchronization with the time of irradiation of the lights, and thus a single eye image is obtained (S20).

An inspection area is set on the photographed single eye image (S30). The inspection area may be set in the scleral region (E_S).

Then, a first color average detection amount is calculated by averaging the light detection amounts of the first color sensing elements, such as the R-color sensing elements, at the location corresponding to the sclera portion E_S. Further, the second color average detection amount is calculated by averaging the light detection amounts of the second color sensing elements, such as the B-color sensing elements, at the location corresponding to the sclera portion E_S (S40).

Then, it may be determined whether said user's eye is a fake eyeball, by calculating a ratio ($A_{average}$) between the first color average detection amount and the second color average detection amount, and comparing the calculated ratio ($A_{average}$) with a predetermined reference ratio ($A_{Ref}$) (S50).

What is claimed is:

1. A method for recognizing a fake eyeball using lights at two wavelengths, wherein the method is performed by an apparatus for recognizing whether an eye of a user is a fake eyeball by analyzing an eye image of the user, said method comprising:

illuminating simultaneously an eye region including the iris and sclera of a user with a light at a first wavelength and a light at a second wavelength;

acquiring, synchronously with said illuminating, a single image of said eye region of said user, by using an imaging device in which R-color sensing elements, G-color sensing elements and B-color sensing elements are arranged in a Bayer pattern;

setting an inspection area by specifying a scleral portion (E_S), in said single image;

calculating a first color average detection amount by averaging the detection amounts of the first color sensing elements at a location corresponding to said inspection area in said single image and a second color average detection amount by averaging the detection amounts of the second color sensing elements at the location corresponding to said inspection area in said single image; and calculating a ratio ($A_{average}$) between said first color average detection amount and said second color average detection amount, and comparing said ratio ($A_{av}$-

$_{erage}$) with a predetermined reference ratio ($A_{Ref}$) to determine whether said user's eye is a fake eyeball.

2. The method according to claim 1, wherein said first wavelength is selected in the range of 750±50 nm and said second wavelength is selected in the range of 850±50 nm.

3. The method according to claim 1, wherein the first color sensing elements are R-color sensing elements, and the second color sensing elements are B-color sensing elements.

4. The method according to claim 1, wherein the reference ratio ($A_{Ref}$) is a ratio ($A_{average\_living}$) between a first color average detection amount and a second color average detection amount each measured at a sclera portion (E_S) of the user's eye, and wherein the ratio ($A_{average\_living}$) have been initially registered by the user to perform the method for recognizing a fake eyeball.

5. The method according to claim 1, wherein the reference ratio ($A_{Ref}$) is a ratio ($A_{average\_artificial}$) between a first color average detection amount and a second color average detection amount experimentally measured using an arbitrary fake eyeball in the sclera portion of an arbitrary fake eyeball.

* * * * *